April 10, 1951  C. A. SMITH  2,548,324
DEFROST CONTROL FOR REFRIGERATION SYSTEMS
Filed Jan. 19, 1950  5 Sheets-Sheet 3
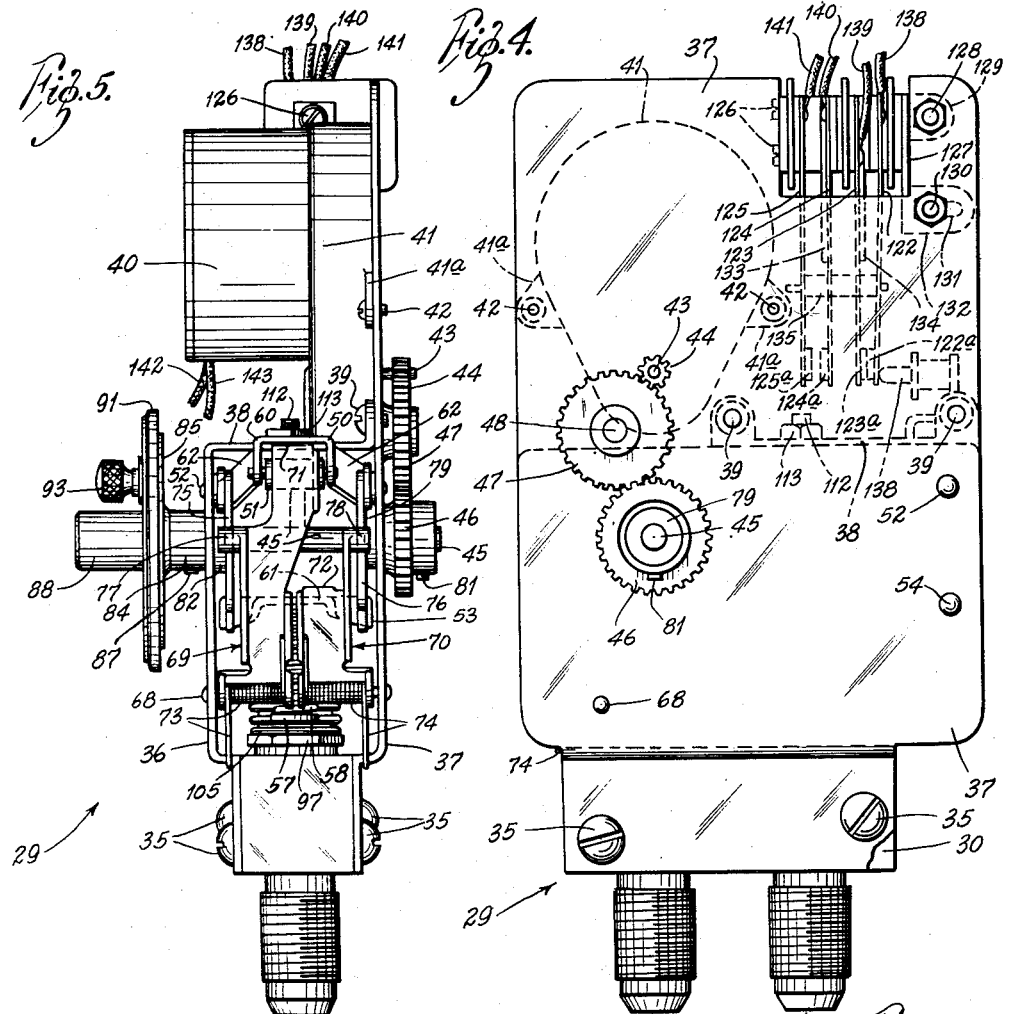
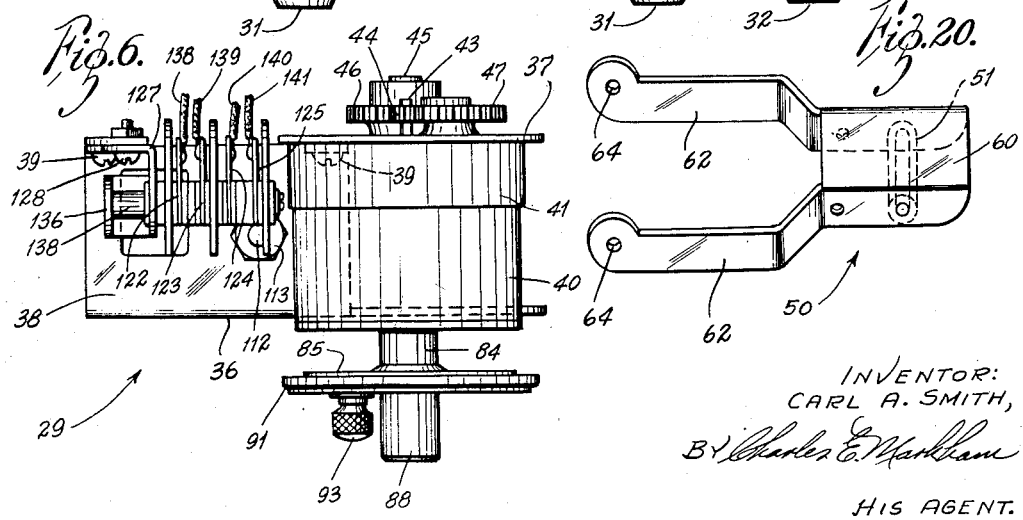
INVENTOR:
CARL A. SMITH,
BY Charles E. Markham
HIS AGENT.

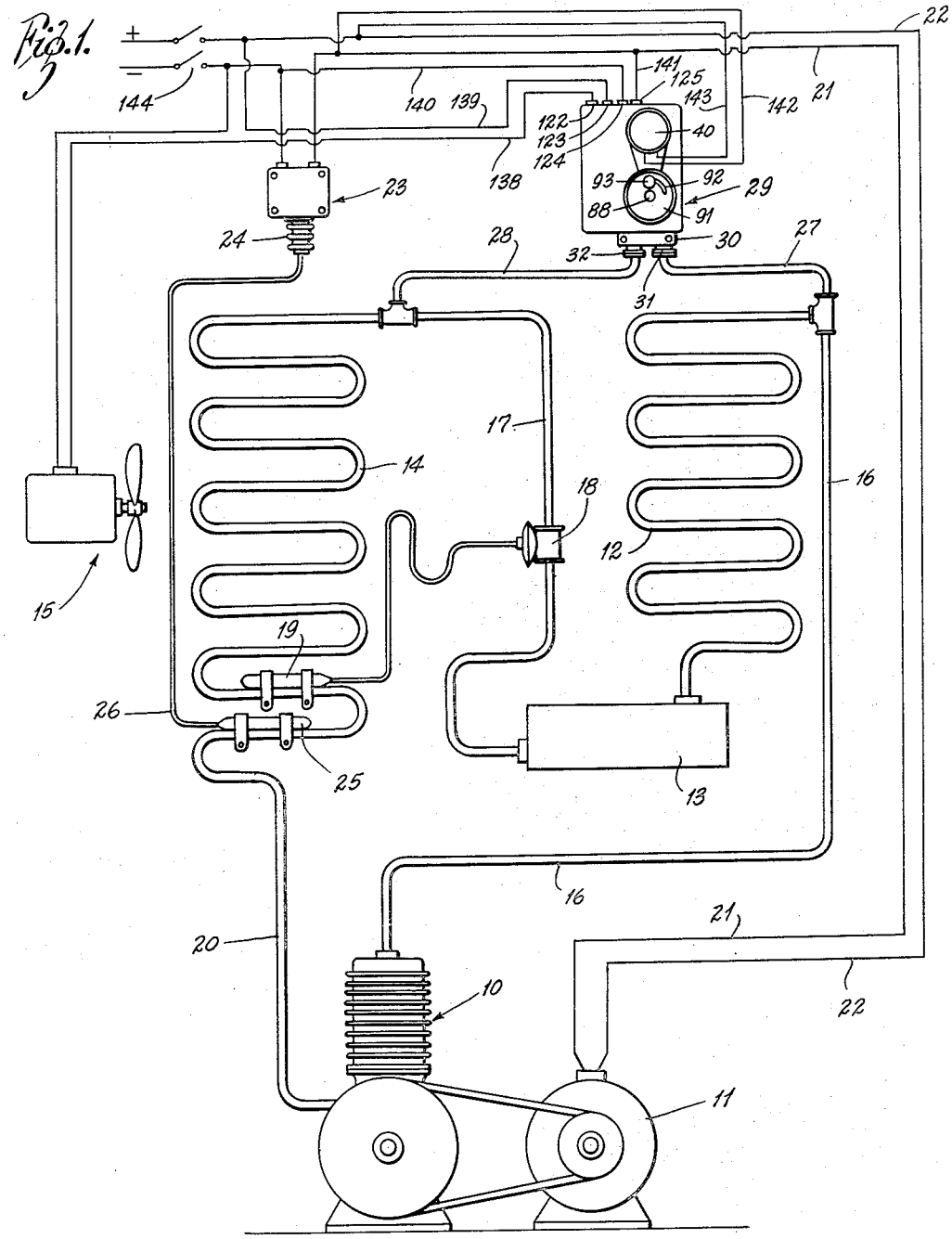

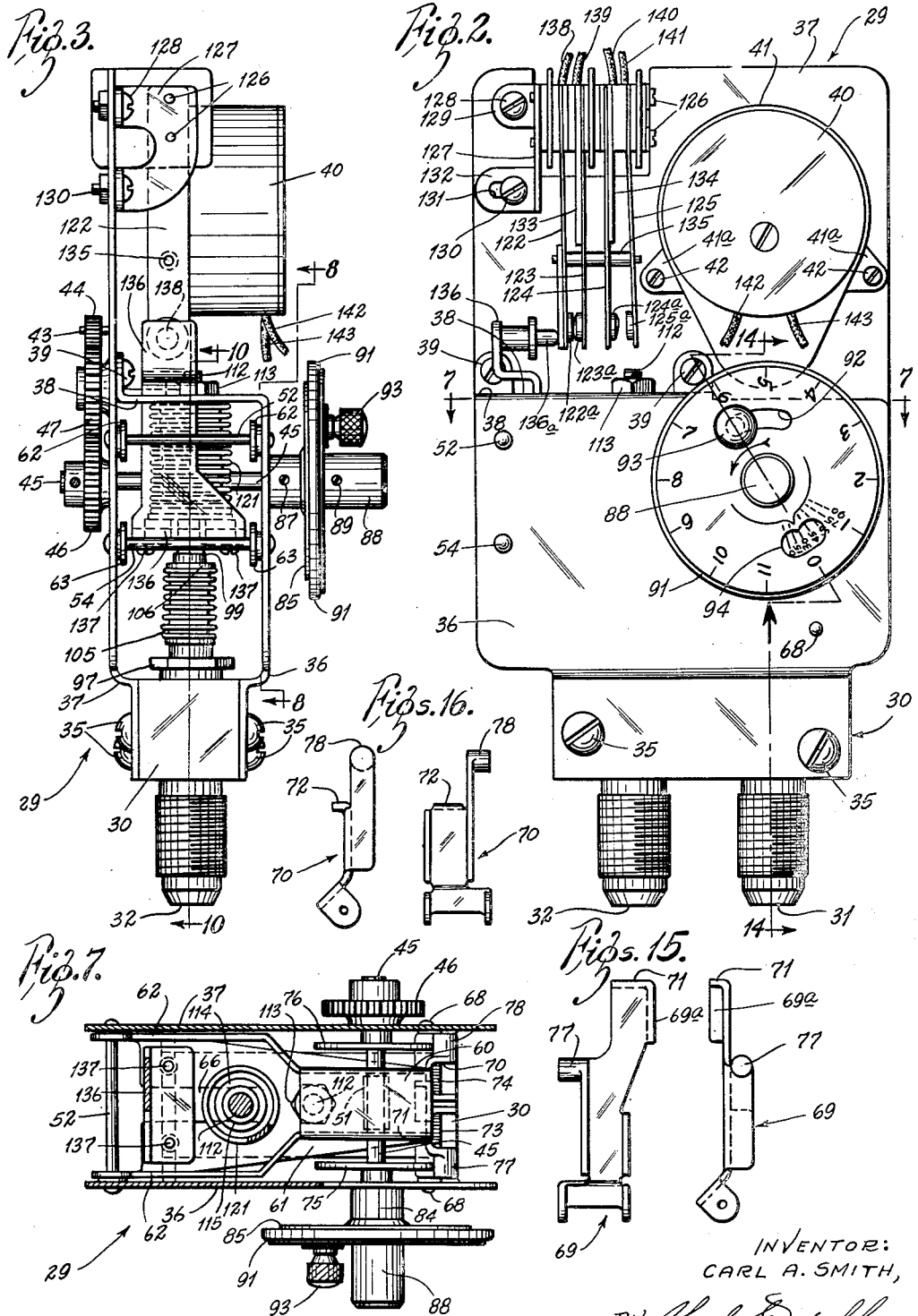

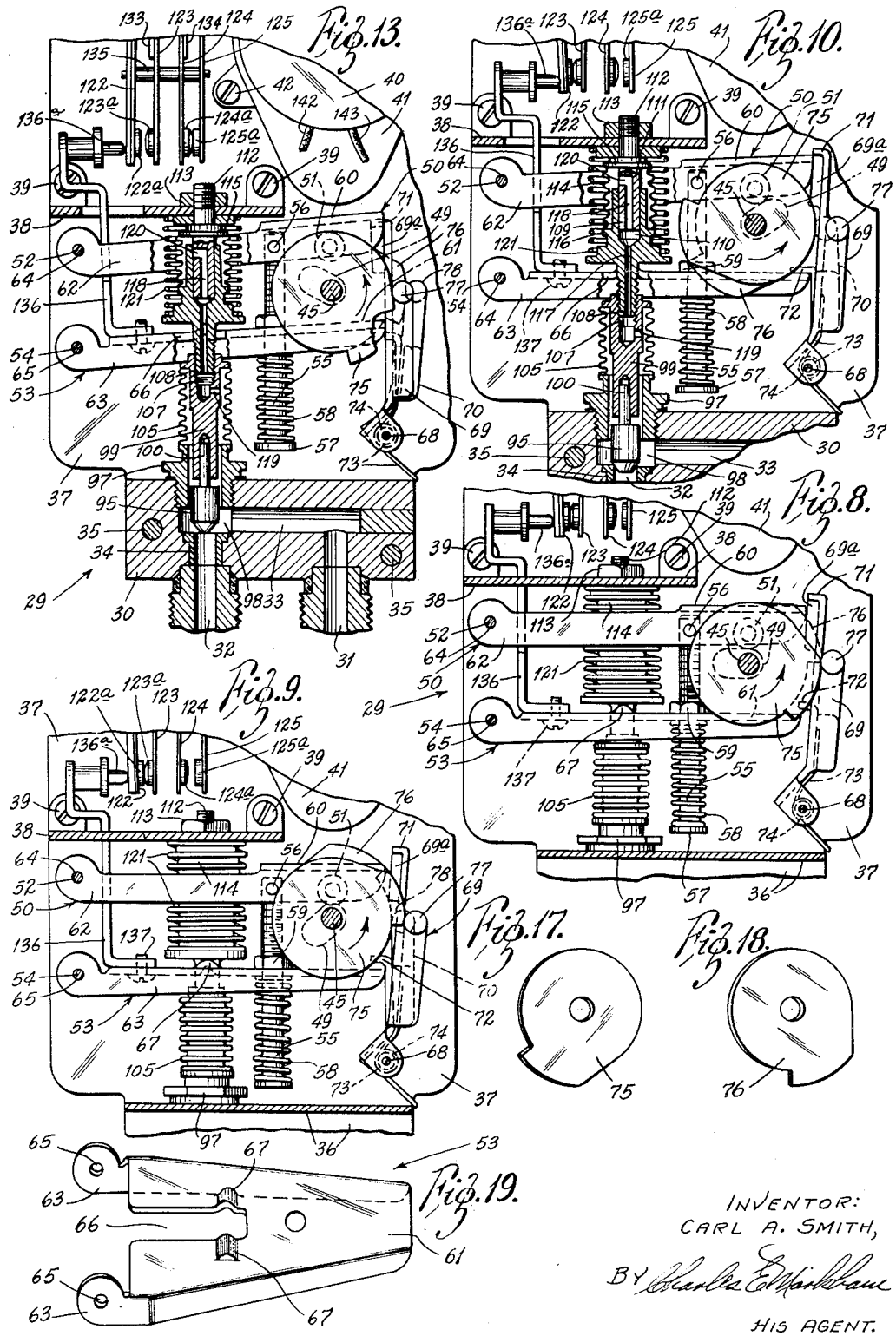

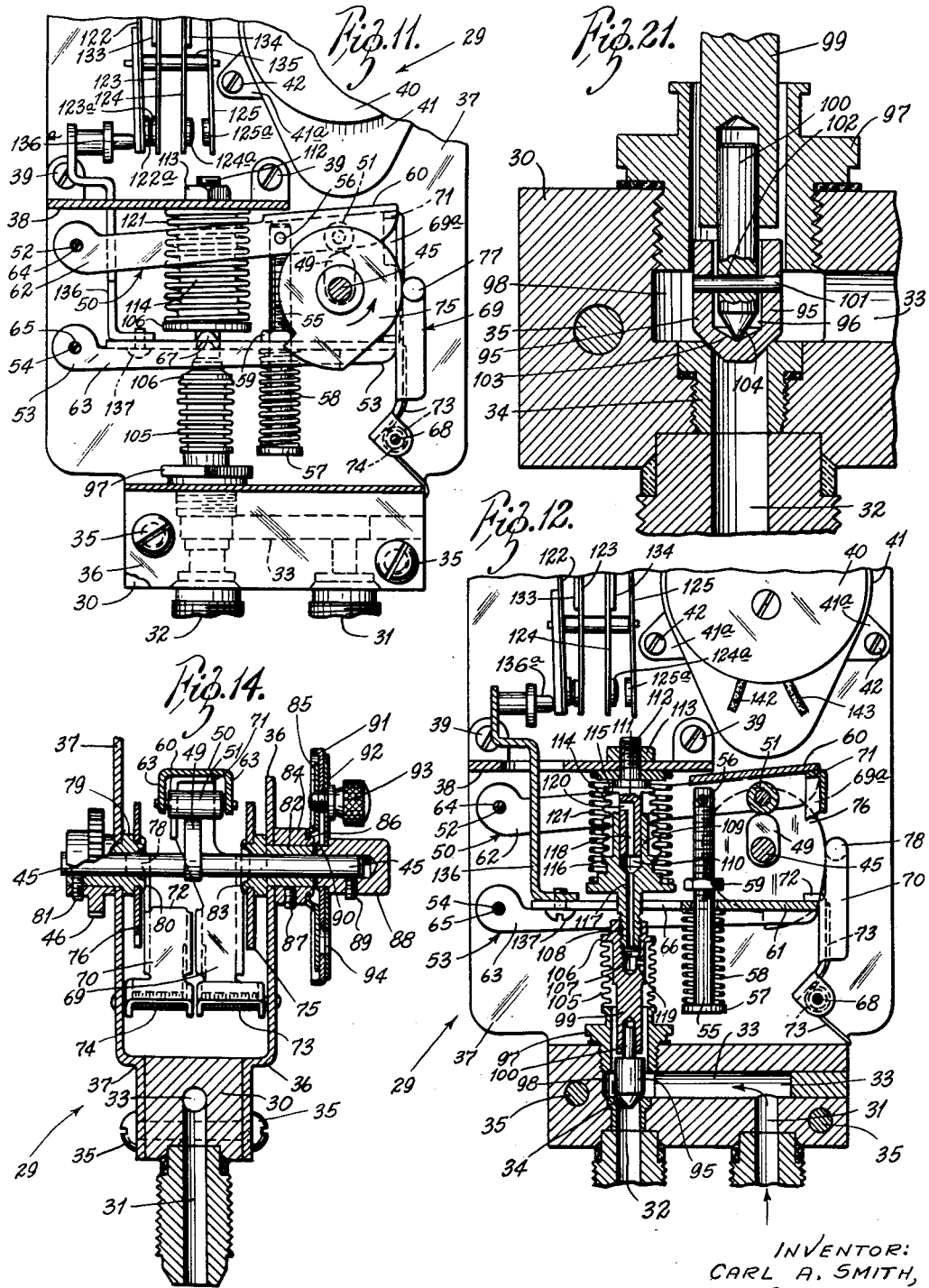

Patented Apr. 10, 1951

2,548,324

UNITED STATES PATENT OFFICE 2,548,324

DEFROST CONTROL FOR REFRIGERATION SYSTEMS

Carl A. Smith, Ferguson, Mo., assignor to Missouri Automatic Control Corporation, St. Louis, Mo., a corporation of Missouri Application January 19, 1950, Serial No. 139,381

10 Claims. (Cl. 161—7)

This invention relates generally to control devices for refrigeration systems of the type which employ means for compressing a gaseous refrigerant, a condenser for cooling and liquefying the refrigerant and an evaporator coil wherein the liquid is again vaporized. It more particularly concerns a control device adapted to be used in a system as above for controlling a by-pass through which the refrigerant in hot gaseous form may be periodically conducted directly from the compressor to the evaporator coil for the purpose of quickly melting any frost accumulations thereon.

It is an object of the invention to provide a generally new and improved automatic defrost control device for causing the flow of hot gaseous refrigerant directly from the output side of the compressor to the evaporator coil in a refrigeration system at predetermined intervals and for a predetermined interval.

A further object is to provide an automatic defrost control device as above which includes a valve for controlling the direct flow of refrigerant from the compressor to the evaporator and a switch for controlling the operation of the compressor, and in which the valve mechanism and switch structure are coordinately actuated so as to simultaneously complete an energizing circuit for the compressor and open the valve to permit the flow of refrigerant.

A further object is the provision of a self-aligning snap action valve suitable for controlling the flow of refrigerant in gaseous form at high pressures in which means is provided for equalizing the pressure acting on the valve.

A further object is the provision of a snap action refrigeration valve suitable for controlling the flow of refrigerant at high pressure in which a relatively low torque synchronous motor is employed as a timing means and actuating force, and in which means is provided for storing the energy of the motor as accumulated over a period of time and for the rapid release of the stored energy at a predetermined time for effecting a snap actuation of the valve.

A further object is the provision of a refrigeration valve in which the energy of a relatively low torque synchronous motor is accumulated over a period of time and released at a predetermined time to open the valve with a snap action against resilient means, wherein it is held by latch means, and in which the latch means is caused to release the valve at a subsequent predetermined time permitting it to again close in a snap action under the urging of the resilient means.

It is a further object to provide in a refrigeration valve as above means whereby the time of release of the stored energy and opening of the valve may be varied and whereby the interval between the release of the energy and the opening of the valve and the release of the latch means to permit closing of the valve may be varied.

Further objects and advantages will become apparent upon reading the following description and accompanying drawings.

In the drawings:

Fig. 1 is a diagrammatical illustration of a refrigeration system in which is incorporated a defrost control constructed in accordance with the present invention;

Fig. 2 is an enlarged front elevation of the defrost control shown in Fig. 1;

Fig. 3 is a left side view of the control shown in Fig. 2;

Fig. 4 is a rear elevation of the control shown in Fig. 2;

Fig. 5 is a right elevation of the control as shown in Fig. 2;

Fig. 6 is a top view of the control shown in Fig. 2;

Fig. 7 is a cross sectional view taken on line 7—7 of Fig. 2;

Figs. 8 to 13 inclusive are different operative views of the snap action valve mechanism and are taken generally on line 8—8 of Fig. 3, the Figs. 10, 12 and 13 being sectionalized in part to more clearly show the construction;

Fig. 14 is a vertical section taken on line 14—14 of Fig. 2;

Figs. 15 are front and side elevations of the front latch member;

Figs. 16 are front and side elevations of the rear latch member;

Fig. 17 is a perspective view of the front cam member;

Fig. 18 is a perspective view of the rear cam member;

Fig. 19 is a perspective view of the lower valve actuation lever;

Fig. 20 is a perspective view of the upper valve actuation lever; and

Fig. 21 is an enlarged detailed cross sectional view of the valve and seat assembly.

The refrigeration system diagrammatically illustrated in Fig. 1 includes as primary elements a compressor 10, an electric compressor driving motor 11, a condenser 12, a receiver 13, an evaporator 14 and a circular blower 15. The output side of the compressor 10 is connected to one end of the condenser by a conduit 16. The other end of condenser is connected to one end of the receiver 13. The other end of the receiver is connected to the upper end of the evaporator coil 14 by a conduit 17. Interposed in the conduit 17 is a conventional thermostatically controlled expansion valve 18 having a temperature sensitive bulb 19 located so as to be sensitive to the temperature of the lower end of the evaporator coil 14. The lower end of the evaporator coil is connected to the intake of the compressor by conduit 20.

The electric driving motor 11 is provided with an energizing circuit comprising the leads 21 and 22 which are connected to a suitable source of electrical power. Interposed in the lead 21 is a conventional control device generally indicated at 23 which functions to control the normal operation of the compressor in accordance with cooling requirements. The control 23 may be arranged so as to be responsive to the temperature of the lower part of evaporator coil 14, in which case it may be provided with an expansible element 24 and a bulb 25 containing a temperature sensitive fluid and lying adjacent the evaporator coil near its lower end and connected to the expansible element by a capillary 26.

In order to introduce hot gas from the output side of the compressor 10 directly to the evaporator coil 14, a by-pass comprising the conduits 27 and 28 is provided around the condenser 12, the receiver 13 and the expansion valve 18. Interposed in the by-pass is a control device generally indicated at 29 for controlling the flow of vaporous hot refrigerant through the by-pass. The control device 29 comprises a valve body 30 having an inlet 31 to which the conduit 27 is connected by any suitable attaching means and an outlet 32 to which the conduit 28 is likewise connected. The inlet 31 and outlet 32 are connected by a cross passage 33. There is a valve seat 34 concentric with the outlet 32 which is preferably constructed of a relatively hard pliable material such as nylon and which may be externally threaded to engage a threaded portion of the outlet 32 as indicated in Fig. 21. Attached to the valve body as by screws 35 are front and rear panel members 36 and 37 respectively. The upper part of front panel member 36 being formed rearwardly at a right angle so as to provide a rearwardly extending portion 38 which is attached to the rear panel member 37 as by screws 39.

Mounted on the front side of the rear panel member 37 and near its upper right hand corner, in Fig. 2, is a synchronous electric timer motor 40. The motor has a case 41 provided with perforated ears 41a through which pass screws 42 for attachment of the motor to the panel member 36. The timer motor 40 is a conventional commercial type which includes speed reduction gearing contained within the case and has a power take off shaft 43 projecting rearwardly through the rear panel 37 and to which is keyed a small pinion 44. The timer motor is also provided with the usual ratchet clutch which permits advancing the power take off shaft without rotating the reduction gear train. There is a horizontal rotatable shaft 45 supported in the front and rear panel members 36 and 37. One end of shaft 45 extends rearwardly of the rear panel and has keyed thereto a spur gear 46. Between the gear 46 and the pinion 44 is an idler gear 47 mounted for rotation on a shaft 48 which is supported in the panel 37. The gears 44, 46 and 47 are in mesh as indicated in Fig. 4.

Rigidly attached to the shaft 45 for rotation therewith and approximately midway between the front and rear panels is a cam 49. Lying above the shaft 45 is a pivoted upper valve actuation lever 50 having a roller 51 which is arranged to be engaged by the cam 49. The lever 50 is pivoted at its left end near the left hand side of the control device on a pivot 52 which is supported in the front and rear panel members. There is a second or lower valve actuation lever 53 which normally lies substantially parallel with the lever 50 and which is also pivoted at its left hand end on a pivot 54 directly below the pivot 52. There is a vertical pin 55 which extends upwardly through an aperature in the lower lever 53 and which is pivotally connected at its upper end to the lever 50 as by a pivot pin 56. The lower end of vertical pin 55 is provided with a head 57 and there is a relatively strong spring 58 biased between the lower surface of the lower lever 53 and the head 57 of the pin 55. The upper portion of the pin 55 is screw threaded and receives a stop nut 59. It will be seen that by this arrangement the free ends of levers 50 and 53 are urged toward each other by the relatively strong spring 58 and that they are limited in their movement toward each other by the stop nut 59.

The valve actuation levers 50 and 53 are formed from flat stock so as to have horizontal platform portions 60 and 61 respectively and downwardly formed leg portions 62 and 63 respectively on both sides of the platform portions, see Figs. 19 and 20. The leg portions are perforated as indicated at 64 and 65 to receive the pivot pins 52 and 54. The platform portion 60 of the upper lever 50 extends only a portion of the length of the lever near its free end and its legs 62 are spread toward its pivoted end as indicated in Fig. 20 to permit mechanism to be described hereinafter to extend therebetween. The platform portion 61 of the lower lever 53 is provided with a longitudinal slot 66 toward its pivoted end and is further provided with a pair of upwardly formed bosses 67 lying on both sides of the slot 66 as shown in Fig. 19 and for a purpose to be hereinafter explained.

Pivotally mounted at their lower ends and near the lower right corner of the control device on a pivot 68 are latch members 69 and 70. The pivot 68 is supported in the front and rear panel members 36 and 37. The front latch member 69 has an angularly formed portion 71 at its upper end which under certain conditions underlays the platform portion at the free end of the upper valve actuating lever 53 as indicated in Figs. 11, 12 and 13 thus preventing its downward movement, and the rear latch member 70 has an angularly formed portion 72 at its upper end which under certain conditions, as indicated in Figs. 10, 11 and 12 overlays the free end of the lower valve actuating lever 50 thus preventing its upward movement. The latch members 69 and 70 are normally urged inwardly toward the end of levers 50 and 53 by springs 73 and 74 respectively. Mounted for rotation with shaft 45 is a front cam 75 and a rear cam 76 which engage cylindrical cam follower portions 77 and 78 on the latch members 69 and 70 respectively thereby to move the upper ends of the latch members outwardly away from the ends of levers 50 and 53 as the shaft 45 and cams 75 and 76 are rotated. The latch member 69 is further provided with a longitudinally extending side flange 69a which extends laterally equally with the angularly formed end portion 71, whereby the portion 71 is held clear of the platform portion 60 of lever 50 until the lever has been raised sufficiently to permit its passing thereunder. It will be seen that as the shaft 45 is rotated, the cam 49 will cause the free end of the upper lever 50 to be lifted, and that under conditions wherein the latch member 70 overlays the lower lever 53, this upward movement of the upper lever 50 will cause the spring 58 to be stressed.

The rear cam 76 is provided with a hub portion 79, see Fig. 14, which is journalled in the rear panel 37 and to which the cam 76 is attached as by riveting as indicated at 80. The hub portion 79 receives the end of shaft 45 and the spur gear 46 is fitted over the hub portion. A set screw 81 passing through both the gear 46 and the hub portion 79 fixes both the gear 46 and the cam 76 to the shaft 45 for rotation therewith. The front cam 75 is also provided with a hub portion 82 which is journalled in the front panel member 36 and to which cam 75 is attached as by riveting as indicated at 83. The hub portion 82 projects forwardly of the front panel 36 and has fitted over it a hub 84 which carries a disc 85 attached thereto as by riveting as indicated at 86. The hub portion 82 is freely mounted for rotation on the shaft 45, but the hub 84 which carries the disc 85 and the hub portion 82 which carries the front cam 75 are fixed for rotation together by a set screw 87. The disc 85 and front cam 75 therefore rotate together on shaft 45.

The shaft 45 projects forward of the disc member 85 and receives at its end a hub 88 which is fixed for rotation therewith as by a set screw 89. The hub 88 has attached thereto as by riveting at 90 a circular dial 91 which lies against the face of the disc 85. The dial 91 is provided with an arcuate slot 92 and there is a knurled headed thumb screw 93 passing through the slot which threadedly engages the disc 85. When the thumb screw 93 is tightened, the dial 91, the disc 85 and front cam 75 rotate with the shaft 45. When the thumb screw is loosened the disc 85 and the front cam 75 may be rotated with relation to the dial 91 and shaft 45 and therefore with relation to the rear cam 76 for a purpose to be described hereinafter. The periphery of the dial face is divided into twelve equal divisions representing hours which are numbered, and there is a reference mark or arrow on the face of the front panel. The disc 85 has a portion of its face divided into fractions of an hour and are so marked, and there is a sight opening 94 in the dial having an index point whereby the angular adjusted position of the disc and therefore the cam 75 with relation to the dial and shaft may be noted.

There is a valve 95 adapted to be moved vertically into and out of the engagement with the valve seat 34. The valve is generally cylindrical in shape having a frusto-conical point at its lower seat engaging end and having a longitudinal bore 96 which opens at its upper end, see Fig. 21. The valve is loosely guided in a hollow externally threaded closure plug 97 which closes the upper end of a vertical passage 98 in the valve body concentric with the valve seat. The valve is loosely connected to the lower member 99 of a two piece valve stem by means of a short pin 100 which is press fitted at its upper end into a longitudinal bore at the lower end of stem member 99. The pin 100 is loosely received at its lower end in the bore 96 of the valve and the valve is connected thereto by a cross pin 101 which is press fitted into the walls of the valve and which loosely fits in a cross bore 102 in the pin 100 near its lower end.

The bottom of the bore 96 in the valve 95 tapers to a central point at a relatively wide angle as indicated at 103 and the lower end of pin 100 has a conical point 104 of lesser included angle engaging it. Thus it will be seen, with the provision of the loosely fitting cross pin 101 and the centrally located and limited contact area between the lower end of pin 100 and the bottom of the bore 96 that the valve is free to achieve alignment with relation to its seat engaging surface.

There is an elongated thin walled corrugated bellows 105 surrounding the lower valve stem member 99 and having its lower end attached to the closure plug 97 and its upper end attached to a flange 106 at the upper end of the valve stem member 99. The bellows may be attached at its ends in any suitable manner as by soldering to insure a pressure tight connection. The upper end of valve stem member 99 is provided with a threaded longitudinal bore 107 which receives in threaded engagement the reduced threaded lower end 108 of an upper valve stem member 109. The upper valve stem member 109 is provided at its upper end with a longitudinal bore 110 which slidably receives a guide pin 111. The guide pin 111 projects upwardly through a perforation in the horizontal portion 38 of the front panel member and is rigidly attached thereto by the provision of a threaded portion 112 at its upper end and a nut 113. A second thin walled corrugated bellows 114 is provided which surrounds the upper portion of the upper valve stem member 109 and the guide pin 111. The bellows 114 is attached at its upper end to a flange 115 on the upper end of the guide pin 111 and at its lower end to a flange 116 on the upper valve stem member 109. The bellows 114 is likewise suitably attached at its ends as by soldering to provide a pressure tight seal.

The interior of the upper bellows 114 communicates with the interior of the lower bellows 105 through the longitudinal passage 107 in the lower valve stem member 99, the passages 117 and 118 in the upper valve stem member 109 and the guide pin 111 respectively and the cross passages 119 and 120 in the lower valve stem member 99 and in the guide pin 111 respectively. Thus it will be seen that the interior of the upper and lower bellows are in communication with the valve body intake 31 due to the free fit of valve 96 in the hollow closure plug 97, that the entire assembly is sealed and that vertical movement of valve and stem assembly is permitted due to the flexibility of the bellows. It will also be seen that intake pressure acting in the lower bellows 105 tending to lift the valve is counteracted by the same pressure in the upper bellows acting to close the valve.

The valve and stem assembly is normally biased downwardly to a valve closed position by a spring 121 which bears at its upper end against the horizontal panel portion 38 and at its lower end against the flange 116 on the upper valve stem member. The lower reduced portion 108 of the upper valve stem member 109 passes through the slot 66 provided in the lever 53 and the flange 116 bears on the rounded bosses 67 of the lever 53, whereby as the lever 53 is rotated counter-clockwise the valve assembly is lifted in the valve opening direction.

Mounted on the rear panel member 37 and near its upper right hand corner is a switch structure comprising flexible switch blades 122, 123, 124 and 125. The blades are stacked on a pair of screws 126 and are suitably spaced by insulating members as shown in Fig. 2. The switch stack is supported on a bracket 127 which may be adjustably mounted on the rear panel 37 as by a pivot screw 128 which passes through a clearance hole in a bracket ear 129 and by a clamp screw 130 which engages a slot 131 in a bracket ear 132. The switch blades 122 and 123 carry contacts 122a and 123a respectively and the switch blades 124 and 125 carry contacts 124a and 125a respectively. The stack switch is further provided with the usual stop plates 133 and 134 and a spacing bar 135. The flexible blades are so formed as to be normally biased in a direction so as to cause the cooperating contacts 122a and 123a to be open, and contacts 124a and 125a to be normally closed, as indicated in Fig. 13. There is a switch actuating arm 136 attached at one end to the lower valve actuation lever 53 as by screws 137 and which at its other end carries a contacting element of dielectric material 136a which engages the switch blade 122 and as lever 53 is rotated clockwise causes the contacts 122a and 123a to close and contacts 124a and 125a to break as shown in Figs. 2, 4, 8, 9, 10, 11 and 12.

The switch blades 122 and 123 are connected to leads 138 and 139 respectively which in turn are connected to leads 21 and 23 to provide a circuit for the energization of the blower 15. The switch blades 124 and 125 are connected to the leads 140 and 141 which provide a shunt around the normal control device 23 as indicated in Fig. 1. The synchronous motor 40 is provided with a pair of leads 142 and 143 connected to a suitable alternating current source. A suitable master switch is indicated at 144.

*In operation*

When the master switch 142 is closed the timer motor 40 is in operation causing the shaft 45 to rotate. The gear reduction to the shaft 45 may be varied to suit requirements, in the present arrangement the gear reduction is such that the shaft 45 makes one revolution in 12 hours.

Referring to Fig. 8 in drawings; in this operative view the cam 49 rotating with shaft 45 in the direction of the arrow has just arrived at its low point with reference to the roller 51 on upper lever 53. The high points of cams 75 and 76 are engaging the latch members 69 and 70 holding them free of the levers 50 and 53 which have been moved to their lowermost or substantially horizontal position by the spring 121. The valve 95 is closed. The switch contacts 122a and 123a are closed completing an energizing circuit for the blower and contacts 124a and 125a are open rendering the shunt around the normal control ineffective. Under these conditions the refrigeration system operates normally under the control of the conventional control device 23.

In Fig. 9, the rotation of shaft 45 has progressed to the point wherein the high point of cam 76 has moved out of engagement with latch member 70 permitting the latch member to rotate counterclockwise under the urging of its spring and to overlay the lower lever 53. The latch 69 however is still held outward from upper lever 50 by the cam 75 and other mechanism remains in the same position as in Fig. 8.

In Fig. 10, the rotation of shaft 45 has further progressed to the point wherein the cam 49 has begun to lift the upper lever 50, and due to the fact that lower lever 53 is held by latch 70, has begun to stress the spring 58. The high point of cam 75 has moved out of engagement with the latch 69 which is now held outward from the end of lever 50 only by its flange 69a. Other mechanism remains the same as in Fig. 8.

In Fig. 11, the rotation of shaft 45 has further progressed to the point wherein the cam 49 has reached its highest point with relation to the roller 51 of lever 50, the free end of lever 50 having reached its highest point and spring 58 being stressed the maximum amount. In this position the free end of the lever has passed the upper end of latch member 69 which therefore has moved inward and now underlays the lever 50 preventing its downward movement.

In Fig. 12 the parts are shown in the same operative positions as in Fig. 11, but are sectionalized in part to more clearly illustrate.

In Fig. 13, the rotation of shaft 45 has further progressed to a point wherein the high point of cam 76 has again engaged the latch member 70 to move it outward from the end of lower lever 53, thus releasing the free end of the lever and permitting it to be moved upward rapidly by the spring 58 and thereby causing the valve 95 to be opened with a snap action against the resistance of the somewhat weaker spring 121, as indicated. The cam 75 however has not progressed sufficiently in this position to move the latch 69 outward from under the upper lever 50. The lever therefore remains held in its uppermost position. As the lower lever 53 is moved upward the upper free end of the switch arm 136 is rotated away from the switch blade 122 permitting the contacts 122a and 123a to break thus deenergizing the blower 15, and permitting the contacts 124a and 125a to close thereby completing a shunt around the normal control 23, which provision insures operation of the compressor driving motor at a time when the valve 95 is open regardless of the position of the normal control.

As the rotation of shaft 45 progresses beyond that position shown in Fig. 13, the high point of cam 75 will engage the latch member 69 to move it outward from under the upper lever 50 as indicated in Fig. 8. When this occurs the free ends of levers 50 and 53 will be moved downward together and the valve will again be closed in a rapid snap action by the spring 121. As the levers move downward permitting the valve to close, the switch arm 136 will again engage the blade 122 causing the contacts 122a and 123a to close, thus energizing the blower and causing the contacts 124a and 125a to break, thus rendering the shunt ineffective and restoring control of the compressor to the normal control device 23.

The angular relationship of the fixed rear cam 76 to the indicia of the dial face is such that the rear latch member 70, which overlays the lower lever 53, is moved out of engagement with the lever permitting it to move upward and open the valve as the "0" mark on the dial registers with the index arrow on the panel. The numerals on the dial face progress in a direction opposite to the rotation of the dial so that the number of hours remaining between the instant of observation and the time the defrost valve is opened may be read opposite the index arrow. The time of opening of the defrost valve with relation to any instant is varied by rotation of the dial in the direction of the arrow which is permitted by the usual ratchet type clutch arrangement incorporated in commercially available synchronous timers.

In order to vary the length of the defrost period, the knurled thumb screw 93 is loosened and the underlying disc 85 is rotated with relation to the dial. This varies the angular relationship of the cams 75 and 76 and determines the interval between the release of latch 69 which permits the valve to open and the release of the latch 70 which permits its closing.

The upper bellows 114 being of similar internal diameter and effected by the same pressure, neutralizes the effect of the intake pressure acting to extend the valve sealing bellows 105 and there is no upward force therefore, tending to lift the valve from its seat. When the valve is open the intake pressure imposes no resistance or assistance to movement of the valve in either direction. When the valve engages the seat however, a force equal to the intake unit pressure times the area of the port in seat 34 acts to supplement the closing spring 121 and increase the contact pressure between the valve and seat insuring a seal. A relatively light or weak closing spring 12 may be used with this arrangement and consequently a proportionately weaker opening spring 58 will suffice requiring less torque and/or time to stress it.

The foregoing description and accompanying drawings are intended to be illustrative and not limiting. The scope of the invention being set forth in the appended claims.

I claim:

1. In an automatic defrost control device for use in a refrigeration system, a valve, a first spring for biasing said valve in a closed position, a second stronger spring capable when stressed and operative when released from a stressed position to open said valve with a snap action against said first spring, a synchronous timer motor, means driven by said motor for stressing said second spring over a period of time and for effecting its release at a predetermined time, a member movable to a first position in which said second spring is rendered operative when released from its stressed position to open said valve and to hold it open, and movable oppositely to a second position in which said second spring is rendered inoperative to hold said valve open, whereby said valve may again be closed with a snap action by said first spring, spring means for biasing said member in one position, and means driven by said motor for moving said member to its other position.

2. In an automatic defrost control device for use in a refrigeration system, a valve, a first spring for biasing said valve in a closed position, a second stronger spring, a synchronous timer motor, means including speed reduction gearing and cam means driven by said motor for building up a stress in said second spring over a period of time and for subsequently effecting its release at a predetermined time, a member movable to a first position in which said second spring is rendered operative to open said valve with a snap action and to hold it open when released from its stressed position, and movable oppositely to a second position in which said second spring is inoperative to affect said valve, whereby it may be again closed with a snap action by said first spring, resilient means for biasing said member to one position, and means driven by said motor for moving it to its other position.

3. In an automatic defrost control device for use in a refrigeration system, a valve, a switching device, a first spring for biasing said valve in a closed position, a second stronger spring, a synchronous timer motor, means driven by said motor for building up a stress in said second spring over a period of time and for effecting its release at a predetermined time, a member movable to a first position for rendering said second spring operative when released from its stressed position to open said valve with a snap action and to hold it open, and movable to a second position in which said second spring is inoperative to hold said valve open whereby it may again be closed with a snap action by said first spring, spring means for biasing said member in one position, means driven by said motor for moving said member to its other position, and a member movable with said valve for the actuation of said switching device.

4. In an automatically operated refrigeration control device, a valve, a first spring for biasing said valve in a closed position, a second stronger spring arranged to oppose said first spring under certain conditions, a synchronous timer motor, means driven by said motor for building up a stress in said second spring over a period of time, spring pressed releasable latch means acting at both ends of said second spring for holding it in a stressed position, one end of said second spring being operatively connected to said valve whereby said valve is opened with a snap action and held open when said end of said second spring is released after being stressed, means driven by said motor for causing the release of said end of said second spring at a predetermined time and after said spring has been stressed, and means driven by said motor for subsequently causing the release of the other end of said second spring at a predetermined time, whereupon said valve is permitted to again close with a snap action under the urging of said first spring.

5. In a device of the class described, a control member movable oppositely between two control positions, a first spring for moving said control member to a first position, and a second stronger spring arranged to act oppositely and capable when stressed of moving said control member to its second position and holding it there, said second spring having a normal unstressed position in which said first spring is permitted to move said control member to its first position, a synchronous timer motor, means driven by said motor for stressing said second spring over a period of time, a first spring pressed latch for restraining one end of said second spring while it is being stressed, a second spring pressed latch for restraining the other end of said spring after it has been stressed, means driven by said timer motor for first releasing said first latch at a predetermined time and after said spring has been stressed, and means driven by said timer motor for subsequently releasing said second latch at a predetermined time.

6. In a device of the class described, a valve, a first spring for biasing said valve in a closed position, a second stronger spring capable when stressed of opening said valve against said first spring, a synchronous timer motor, means driven by said motor for stressing said second spring over a period of time, a spring pressed latch for restraining said second spring while it is being stressed, means driven by said motor for releasing said latch at a predetermined time and after said spring has been stressed, a member movable to a first position for rendering said second spring operative when released to open said valve and to hold it open, and movable to a second position in which said second spring is rendered inoperative to hold said valve open, spring means normally biasing said member in said first position, and means driven by said timer motor for moving said member to its second position at a predetermined time.

7. In a device of the class described, a valve, a first spring for biasing said valve in a closed position, a second stronger spring operatively connected at one end to said valve and capable of opening said valve and holding it open against said first spring when stressed in a direction opposed thereto, a synchronous timer motor, a shaft driven by said motor, speed reduction gearing between said motor and said shaft, clutch means between said shaft and said motor for permitting said shaft to be rotatably advanced with relation to said motor, a first cam on said shaft for engaging the other end of said second spring to move it in a direction and to a position over a period of time wherein it is stressed to oppose said first spring, a first latch for restraining said first mentioned end of said second spring while it is being stressed, a second latch for restraining the other end of said second spring after it is stressed, said latches being normally urged toward a latching position by resilient means, a second cam rotatable with said shaft for releasing said first latch at a preselected time and after said second spring has been stressed, a third cam rotatable with said shaft and angularly adjustable thereon for releasing said second latch a preselected interval after the release of said first latch.

8. In a refrigeration control device for controlling the flow of refrigerant at high pressures, a valve body having an inlet and an outlet, and a valve seat in said body therebetween, a valve in said body adapted to engage said seat and arranged to be moved anteriorly to open, an opening in said body, a valve stem connected to said valve and extending through said opening and exteriorly of said body, a first bellows surrounding said valve stem and having one end attached to said body and its other end attached to said valve stem exteriorly of said body for sealing said body opening and permitting longitudinal actuation of said valve stem, said bellows being in communication with said inlet, a second bellows having one end connected to said valve stem and its other end fixed so as to oppose said first bellows when both are subjected to internal pressure, said second bellows also being in communication with said inlet, spring means for closing said valve, and means operatively engaging said valve stem exteriorly of said body for opening said valve intermittently.

9. In a refrigeration control device for controlling the flow of refrigerant at high pressures, a valve body having an inlet and an outlet, and a valve seat in said body therebetween, a valve in said body adapted to engage said seat and arranged to be moved anteriorly to open, an opening in said body, a valve stem connected to said valve and extending through said opening and exteriorly of said body, a first bellows surrounding said valve stem and having one end attached to said body and its other end attached to said valve stem exteriorly of said body for sealing said body opening and permitting longitudinal actuation of said valve stem, a second bellows having one end connected to said valve stem and having its other end fixed so as to oppose said first bellows when both are subjected to internal pressure, said first and second bellows both having communication between their interiors and said inlet, a first spring for closing said valve, a second relatively stronger spring, a synchronous timer motor, means driven by said motor for stressing said second spring over a period of time and for effecting its release at a predetermined time, a member movable to a first position for rendering said second spring operative when released from its stressed position to open said valve and to hold it open against said first spring and movable to a second position in which said second spring is inoperative to hold said valve open, resilient means for moving said member to its first position, and means driven by said motor and operative subsequent to the release of said second spring for moving said member to its second position.

10. In a device of the class described, a valve body having an inlet and an outlet, a valve seat in said body between said inlet and outlet, an opening in said body concentric with said valve seat, a valve stem passing through said opening and extending exteriorly and interiorly of said body, an elongated valve arranged to be moved anteriorly to open having a conical end adapted to engage said seat and having a longitudinal bore opening at its other end and loosely receiving the inner end of said valve stem, the inner end of said valve bore being terminated in a conical shaped cavity and the inner end of said valve stem being terminated in a conical point adapted to engage the apex of said cavity, the included angle between the sides of said conical valve stem point being substantially less than the included angle between the sides of said conical shaped cavity, a transverse connecting pin press fitted in the walls of said valve and loosely received in a transverse bore through said valve stem near its inner end, a first flexible sealing bellows surrounding an exterior portion of said valve stem having its inner end attached to said body and its outer end attached to said valve stem, a second bellows having communication with said inlet and arranged to oppose said first bellows, and means operatively engaging said valve stem exteriorly of said body for actuation of said valve.

CARL A. SMITH.

REFERENCES CITED

The following references are of record in the file of this patent:

UNITED STATES PATENTS

| Number | Name | Date |
| --- | --- | --- |
| 2,396,809 | Addison | Mar. 19, 1946 |